C. B. GUY.

Tire Setter.

No. 100,028.

Patented Feb. 22, 1870.

Witnesses:
Chas. Niola
Edgar Tate

Inventor:
C B Guy
per Munn & Co
Attorneys

United States Patent Office.

C. B. GUY, OF POSTVILLE, IOWA.

Letters Patent No. 100,028, dated February 22, 1870.

IMPROVEMENT IN TIRE-SETTING AND COOLING APPARATUS.

The Schedule referred to in these Letters Patent and making part of the same

*To all whom it may concern:*

Be it known that I, C. B. GUY, of Postville, in the county of Allamakee, and State of Iowa, have invented a new and Improved Tire-Setting and Cooling Apparatus; and I do hereby declare that the following is a full, clear, and exact description thereof, which will enable others skilled in the art to make and use the same, reference being had to the accompanying drawings forming part of this specification.

This invention relates to improvements in apparatus for holding the wheels for setting wagon-tires, and consists in an arrangement of the holding frame for adjusting the holding spindle or bolt toward or from one edge thereof; also in an arrangement for tilting the frame by means of a foot-treadle, to bring the rim of the wheel thereon down into water held in a trough at the side for cooling the tire, all as herein-after more fully specified.

Similar letters of reference indicate corresponding parts.

Figure 1:
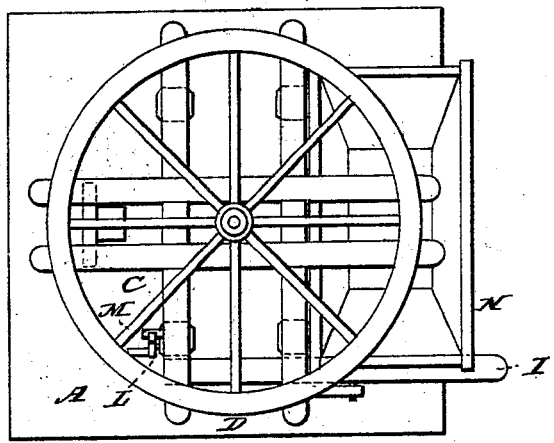
Figure 1 is a plan view of my improved apparatus.
Figure 2:
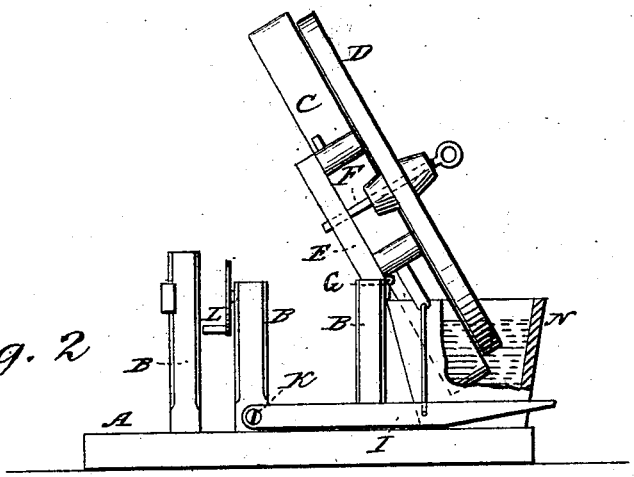
Figure 2 is a side view of the same when tilted, and showing a part of the water-trough broken away.

A is a platform or bed from which rises a number of posts, B, of any suitable arrangement for the support at a proper distance above the bed of the frame C, which is to support the wheel D when the tire is forced on after being heated.

This frame is provided with a board or plate, E, at the under side with a number of holes for the reception of the spindle-bolt F, arranged for adjusting the same toward or from one side, so that the rim of the wheel, no matter what the diameter may be, can be brought as near as required to the downward-tilting side for immersing in the water.

The said frame is pivoted or hinged to the posts B on that side of the center where the trough is placed, as shown at G, and it is connected by a rod, H, with a foot-treadle, I, pivoted to the frame at K.

L is a catch-lever pivoted to one of the posts in a suitable position for holding the frame in the horizontal position by taking on a pin, M, thereon.

N is the water-trough placed on the bed A, and suitably arranged for the reception of the rim of the wheel when the frame is tilted.

When so tilted and immersed in the water, the wheel may be turned on the spindle F to bring all parts of the tire into the water for cooling.

Having thus described my invention,

I claim as new and desire to secure by Letters Patent—

The combination of the tilting frame, arranged for adjusting the spindle as described, the trough N, and foot-treadle I, all substantially as specified.

C. B. GUY.

Witnesses:
  J. H. BURHANS,
  W. L. BEEKS.